United States Patent [19]
Wiesler et al.
[11] 3,900,244
[45] Aug. 19, 1975

[54] VISUAL SELECTION AND PRECISION ISOLATION SYSTEM FOR MICROELECTRONIC UNITS

[75] Inventors: Mordechai Wiesler, 6 Carmel Cir., Lexington, Mass. 02173; John C. McCarron, 9A Ellis Ct., Woburn, Mass. 01801

[73] Assignee: Teledyne, Inc., Woburn, Mass.

[22] Filed: July 5, 1974

[21] Appl. No.: 486,217

Related U.S. Application Data

[63] Continuation of Ser. No. 290,968, Sept. 21, 1972, abandoned.

[52] U.S. Cl. .................... 350/81; 350/10; 350/35; 350/91

[51] Int. Cl. .................... G02b 21/20

[58] Field of Search ............ 350/81, 10, 30, 33, 35, 350/91; 356/163

[56] References Cited

UNITED STATES PATENTS

| | | | |
|---|---|---|---|
| 3,388,848 | 6/1968 | Youmans et al. | 350/81 X |
| 3,442,583 | 5/1969 | Rottman | 350/30 X |
| 3,565,534 | 2/1971 | Chaban | 350/81 X |
| 3,582,178 | 6/1971 | Boughton et al. | 350/10 |
| 3,680,947 | 8/1972 | Wanesky | 350/81 |
| 3,696,985 | 10/1972 | Herring et al. | 350/81 X |
| 3,730,342 | 5/1973 | Egan et al. | 350/81 X |

*Primary Examiner*—David H. Rubin
*Attorney, Agent, or Firm*—Morse, Altman, Oates & Bello

[57] ABSTRACT

In a system for visually selecting and precisely isolating microelectronic units, two object fields communicate via a beam splitter arrangement with a binocular component, and bright cross hairs are imaged on one of the object fields by a projector component, so that adjusting the position of a wafer supporting the microelectronic units permits precise location of any unit at the center of the cross hairs for visual examination of its top face in one of the object fields, for visual examination of its bottom face in the other of the object fields, and for precision movement with respect to the center of the cross hairs to any selected location.

17 Claims, 6 Drawing Figures

VISUAL SELECTION AND PRECISION ISOLATION SYSTEM FOR MICROELECTRONIC UNITS

This is a continuation of application Ser. No. 290,968, filed Sept. 21, 1972, and now abandoned.

BACKGROUND AND SUMMARY

The present invention relates to the examination and sorting of microelectronic units, for example, transistors, diodes, integrated circuits, beam lead devices, and the like, and more particularly to the successive examination and sorting of microelectronic units that are fabricated in an array on a wafer. Difficulties have been encountered in isolating any selected unit of such an array for examination of its two faces and for movement to a precisely determined new location.

The primary object of the present invention is to provide a system for visually selecting and precisely isolating microelectronic units on a wafer, comprising a beam splitting arrangement by which a binocular component communicates via distinct optical paths with two object fields, and a projector component by which bright cross hairs are focused on one of the object fields, associated with a precision mechanical movement for adjusting the position of the wafer in order to permit precise isolation of any unit at the center of the cross hairs for visual examination of its top face in one of the object fields, for visual examination of its bottom face in the other object fields, and for precision removal of the selected unit from the wafer with respect to the center of the cross hairs for positioning in a new array or the like. The two optical fields are illuminated alternately in order to enable visual inspection alternately via the two optical paths.

Other objects of the present invention will in part be obvious and will in part appear hereinafter.

The invention accordingly comprises the apparatus, together with its components and interrelationships thereamong, which are exemplified in the disclosure hereof, the scope of which will be indicated in the appended claims.

BRIEF DESCRIPTION OF DRAWINGS

For a fuller understanding of the nature and objects of the present invention, reference is made to the following detailed description, taken in connection with the accompanying drawings, wherein.

DETAILED DESCRIPTION

Figures 1, 3:
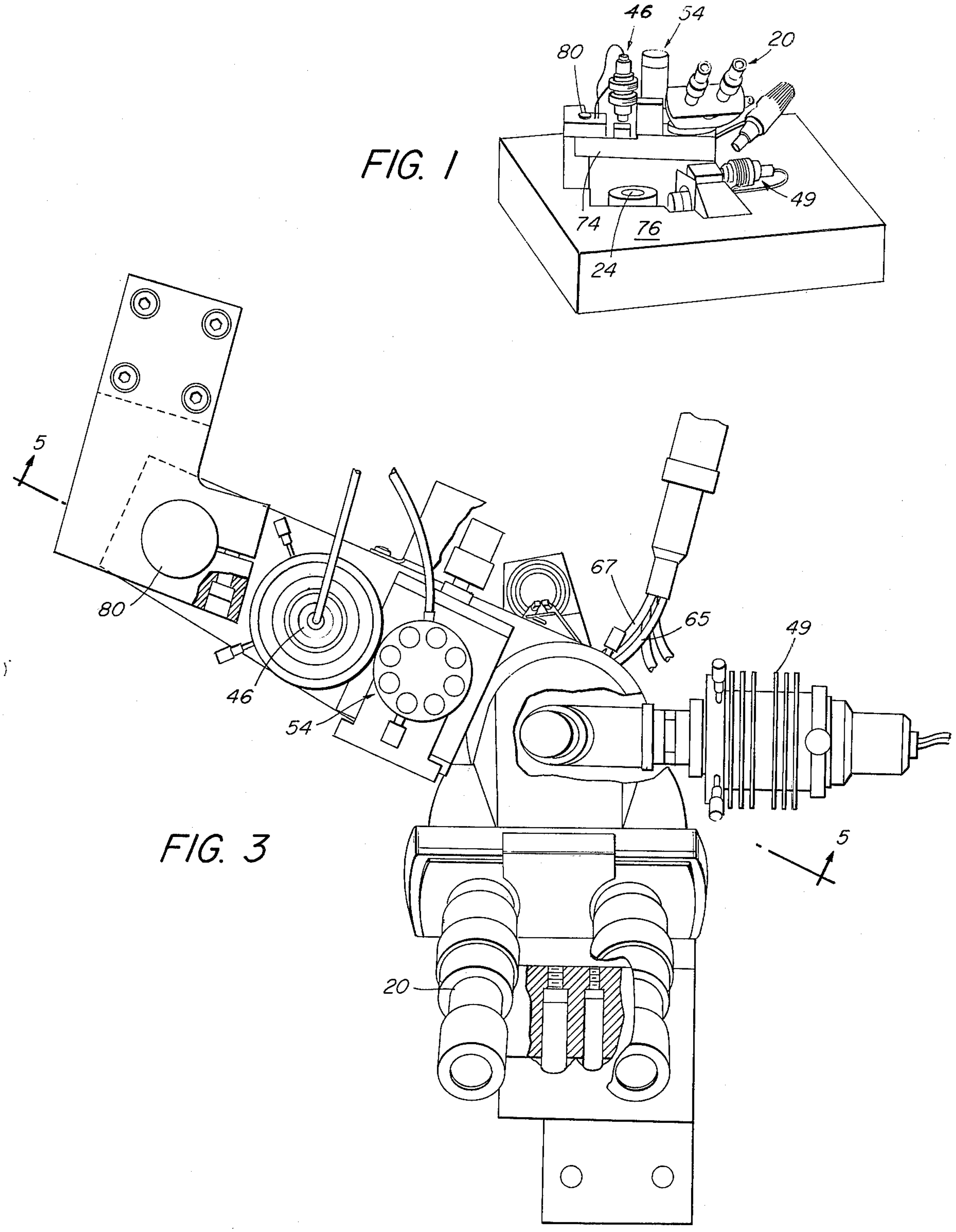
FIG. 1 is a perspective view of an optical selection and isolation system embodying the present invention.
FIG. 3 is a top plan view, partly broken away, of the system of FIG. 1.
Figures 2, 2A, 5:
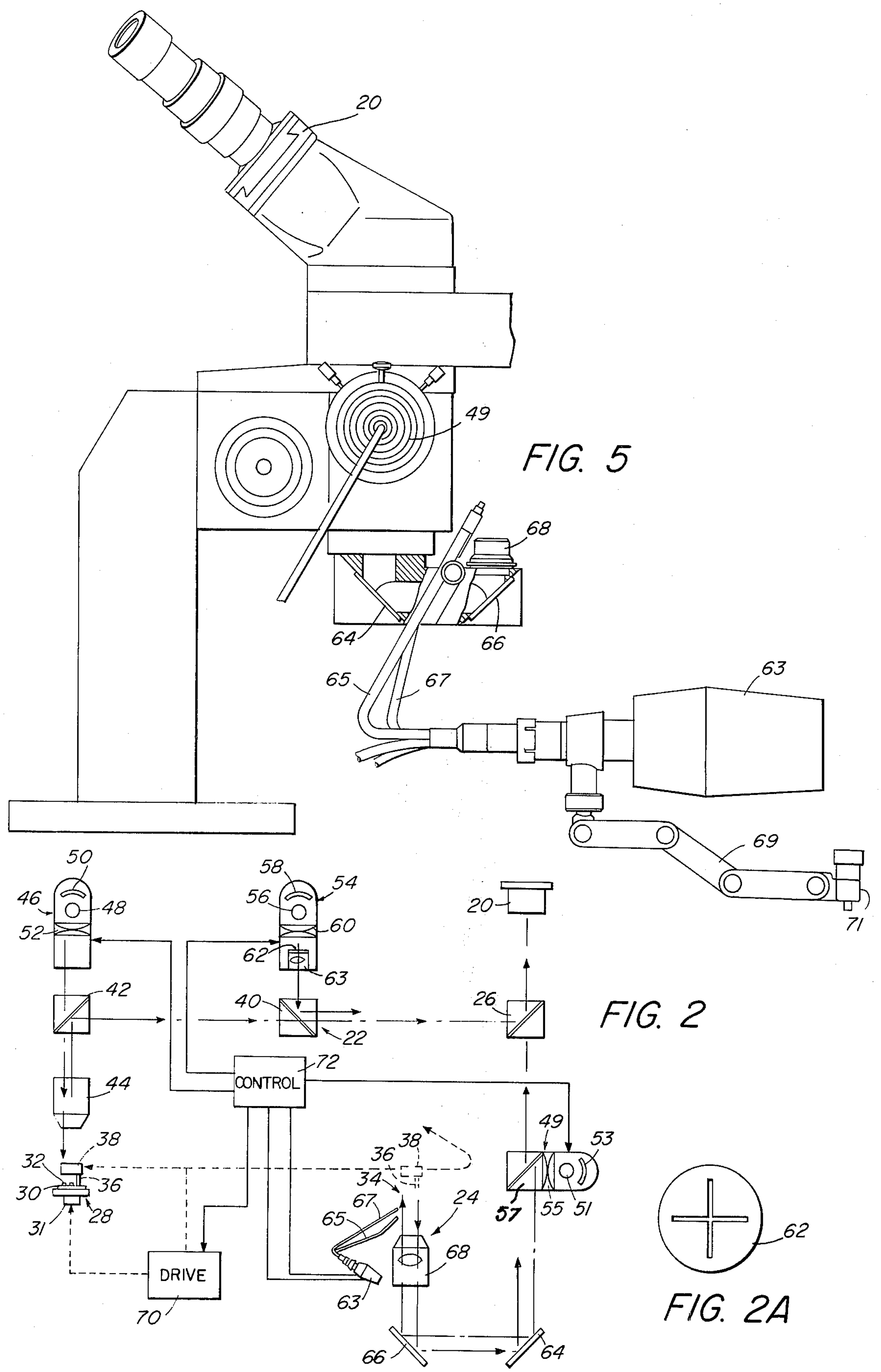
FIG. 2 is a schematic diagram illustrating the basic principles of the system of FIG. 1.
FIG. 2A is a plan view of a cross hair mask.
FIG. 5 is a side elevation of the system.
Figure 4:
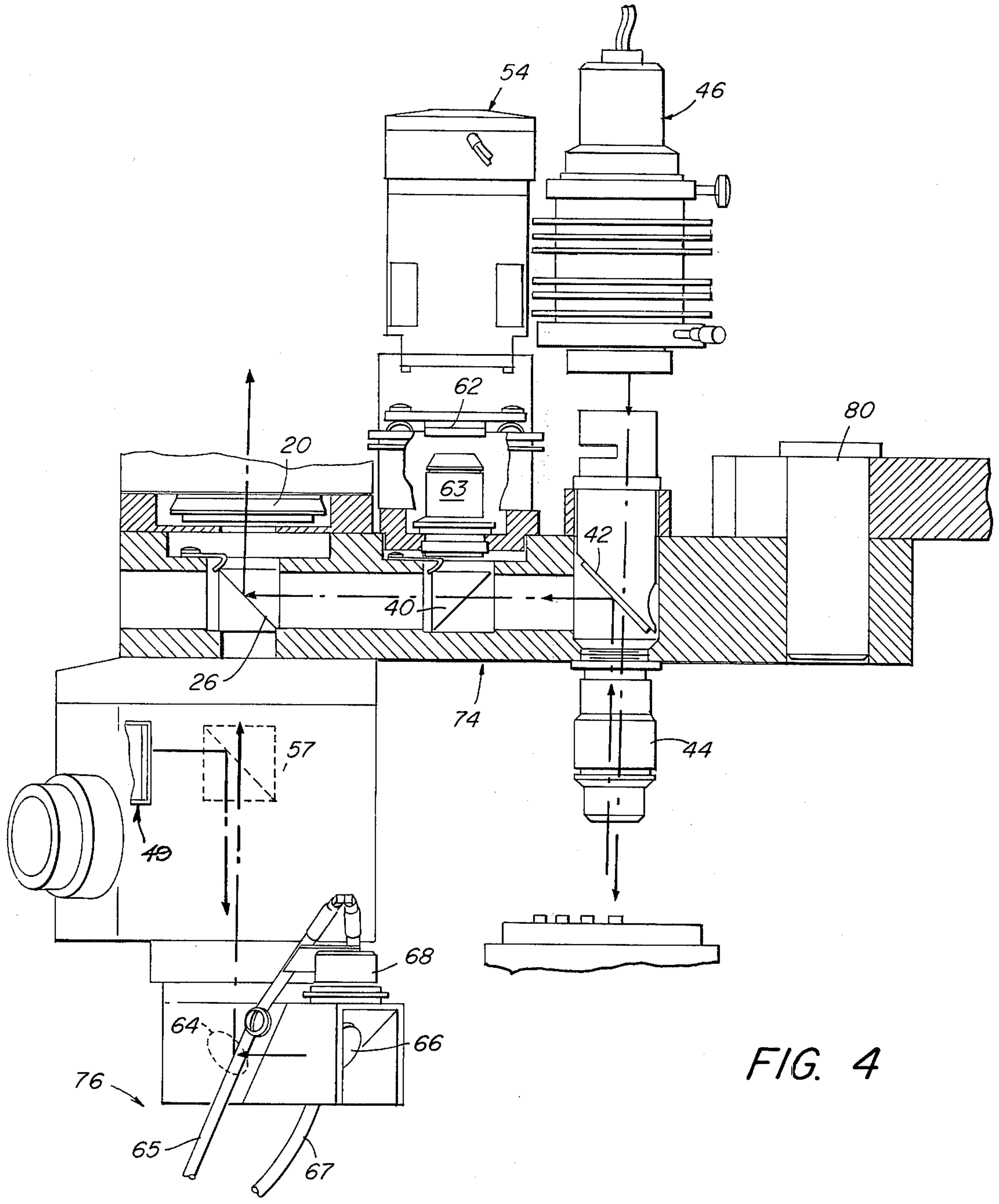
FIG. 4 is a cross-sectional view of the system, taken substantially along the line 4—4 of FIG. 3.

Generally, as shown in FIGS. 1 and 2, the illustrated embodiment comprises a binocular pair 20 that communicates via a 45° beamsplitter 26, with a first optical path 22 for observing the top of a selected microelectronic unit and a second optical path 24 for observing the bottom of this selected microelectronic unit. In an alternative embodiment, binocular pair 20 is replaced by a vidicon tube which presents the image on a closed circuit television display. Optical path 22 includes, at its object plane 28, a vacuum plate that is constrained for motion by a precision X,Y movement 31 and that carries a wafer 30 having fabricated thereon a plurality of such microelectronic units 32. Optical path 24 includes an object plane 34, to which the selected microelectronic unit is carried by a vacuum needle 36 that is constrained for motion by a transfer mechanism 38.

As shown, optical path 22 includes, in sequence, a 45° beamsplitter 42, and a microscope objective lens 44. An illuminator 46, having an incandescent lamp 48 interposed between a spherical reflector 50 and a pair of condensing lenses 52, directs parallel illuminating light through beamsplitter 42 and objective lens 44 to wafer 30. Reflected imaging light is focused by objective lens 44, deflected by beamsplitter 42, transmitted by a beamsplitter 40, and deflected by beamsplitter 26, for observation through the eyepieces of binocular 20.

Superposed on the image of object plane 30, as observed through binocular 20, are bright cross hairs that constitute an image cast by a cross hair projector 54. Cross hair projector 54, having an incandescent lamp 56 interposed between a spherical reflector 58 and a pair of condensing lenses 60, directs parallel light through a slotted mask 62 and an objective lens 63. A plan view of mask 62 is shown in FIG. 2A as being opaque except for a slot in the form of a cross or other shape. The resulting bright cross hair image is deflected by beamsplitters 40, 26 for observation through the eyepieces of binocular 20.

As shown, optical path 24 includes, in sequence, a 45° mirror 64, a 45° mirror 66, and a microscope objective lens 68. A pair of differently oriented fiber optics illuminating conductors 65, 67, which are illuminated by an illuminator 63, are capable of directively illuminating the face of the device at angles as opposed to whole field direct parallel light that is vertical with respect to the object plane of microscope lens 68. An optional illuminator 49, having an incandescent lamp 51 interposed between a spherical reflector 53 and a pair of condensing lenses 55, alternatively is capable of illuminating the bottom of the selected microelectronic unit through a beamsplitter 57.

As shown in FIG. 2, an electromotive drive 70 enables precision X,Y movement of plate 28 under the control of an operator observing wafer 30 through optical path 22. Such movement, from a visual standpoint, permits locating any selected microelectronic device at the center of the bright cross hairs projected by cross hair illuminator 54. This selected microelectronic unit then is in the precise position at which it can be removed from the array of microelectronic units by a vacuum needle 36. Electromotive drive 70, under the control of the operator, is capable of moving vacuum needle 36 from the point designated by the object cross hairs in object plane 28 first to a point in object plane 34 where the bottom of the selected microelectronic device can be observed and then to any other precise point with respect to the bright cross hair center as a reference. A control 72 selectively energizes illuminator 46, fiber optics illuminators 65 and 67 or illuminator 49 in order to permit selected observation while minimizing mechanical switching.

As shown in FIGS. 1, 3, 4, and 5, the optical assembly of the present invention mechanically is associated with a housing having an upper portion 74 and a base portion 76. Mounted within the housing are beamsplitter 40 and beamsplitter 42. Mounted on the housing for communication through apertures therein are binocular pair 20, illuminator 54, illuminator 46, objective lens 44, illuminator 49, and objective lens 24, together with associated optics. Mounted within base portion 76 are precision control 31, support 28 and positioning vacuum needle 38. Upper portion 74 and base portion 76 are connected by a mounting pin assembly 80.

OPERATION

In operation, a wafer 30 carrying an array of microelectronic units is placed on plate 28. Next illuminators 54 and 46 are switched on so that the wafer 30 is visible through binocular unit 20 in association with bright cross hairs. Next a particular microelectronic unit 32 is selected by movement of plate 28 until this microelectronic unit is under the center of the bright cross hairs. Following visual inspection, this microelectronic unit is lifted by vacuum needle 36, which initially is at a point between 28 and 34, and moved to the center of object plane 34. Then illuminator 49 is switched on and illuminators 46 and 54 switched off in order to enable visual examination of the bottom of the selected microelectronic unit. Finally, the vacuum needle 36 carries the selected microelectronic unit to a classified location in precise reference to its original position under the center of the bright cross hairs. From this classified location, this selected microelectronic unit can be retrieved when a microelectronic unit of its classification is required. The arrangement is such that objective 44 and ocular 20, and objective 68 and ocular 20 each have a pair of conjugate planes. The top of vacuum needle 36 lies in the conjugate object planes of objectives 44 and 68, the top of vacuum needle 36 and mask 62 being imaged in the conjugate image plane of ocular 20.

The present invention thus provides an optical system by which microelectronic units in an array can be visually classified and mechanically isolated in such a way as to enable their future retrieval. Since certain changes may be made in the above embodiment of the present invention without departing from the scope of the present invention, it is intended that all matter contained in the foregoing description or shown in the accompanying drawing can be interpreted in an illustrative and not in a limiting sense.

What is claimed is:

1. An optical system for visually selecting and precisely locating microelectronic units, said optical system comprising first optical means including first imaging means having a first pair of conjugate planes in a first optical path, second optical means including second imaging means having a second pair of conjugate planes in a second optical path, observation means visually communicating with one of said first conjugate planes and one of said second conjugate planes, third optical means for projecting a reticle image, beam splitting means for superposing said reticle image onto said one of said first conjugate planes and said one of said second conjugate planes, said one of said first conjugate planes and said one of said second conjugate planes being coplanar with the reticle image plane, first illuminating means for said second optical path, first mechanical means for adjustably positioning a plurality of microelectronic devices in the other of said first conjugate planes and in the other of said second conjugate planes, second mechanical means for selecting one of a plurality of microelectronic devices with reference to said reticle image for movement through a predetermined distance with reference to said reticle image, and control means for switching said first illuminating means and said second illuminating means, whereby different aspects of a particular microelectronic unit optically centered initially may be examined.

2. The optical system of claim 1 wherein said first imaging means includes a microscope objective adjacent to said one of said first conjugate planes and said second optical means includes a microscope objective adjacent to said one of said second conjugate planes.

3. The optical system of claim 1 wherein said observation means is a binocular pair.

4. The optical system of claim 1 wherein said observation means is a television camera.

5. The optical system of claim 1 wherein said third optical means includes a projection lens for optically positioning bright reticles at least on said one of said conjugate planes.

6. The optical system of claim 1 wherein said third optical means includes an opaque mask having a slotted shape thereon, said third optical means including third imaging means having a third pair of conjugate planes one, of said third pair of conjugate planes being at said slotted mask and the other of said third pair of conjugate planes being coplanar with said one of said first pair of conjugate planes and said one of said second pair of conjugate planes.

7. The optical system of claim 1 wherein said control means selects one of said first illumination means and said second illumination means at one time.

8. The optical system of claim 1 wherein said one of said first conjugate planes and said one of said second conjugate planes are coplanar.

9. An optical system for visually selecting and precisely locating microelectronics units, said optical system comprising a base housing, a lower support for manually positioning a plurality of said units in said base housing, upper pick-up means moveable with respect to said base housing between several accurate positions, first optical means including first imaging means having a first pair of conjugate planes in a first optical path, one of said first pair of conjugate planes lies at an upper face of said unit on said lower support, second optical means including second imaging means having a second pair of conjugate planes in a second optical path, one of said second pair of conjugate planes lies at a lower face of said unit on said upper pick-up means, third optical means for projecting an image of a reticle on the other of said first conjugate planes and on the other of said second conjugate planes, beam splitting means for superposing said reticle image on said other of said first conjugate planes and said other of said second conjugate planes, observation means visually communicating with said other of conjugate planes, first illuminating means for said first optical path, second illuminating means for said second optical path, first control means for positioning said pick-up means at precise locations with respect to said image, and second control means for switching said first illuminating means, said second illumination means, and said third optical means, whereby the upper and lower faces of a particular microelectronic unit may be examined.

10. The optical system of claim 9 wherein said first optical means includes a microscope objective adjacent to said one of said first conjugate planes and said second optical means includes a microscope objective adjacent to said one of said second conjugate planes.

11. The optical system of claim 9 wherein said observation means is a binocular pair.

12. The optical system of claim 9 wherein said third optical means includes projection means including third imaging means and an opaque mask having a slotted shape thereon, said third imaging means having a third pair of conjugate planes, one of said third pair of conjugate planes being at said slotted mask and the other of said third pair of conjugate planes being coplanar with said other of said first pair of conjugate planes and said other of said second pair of conjugate planes.

13. The optical system of claim 9 wherein said control means selects one of said first illumination means and said second illumination means at one time.

14. The optical system of claim 9 wherein said one of said first conjugate planes and said one of said second conjugate planes are coplanar.

15. The optical system of claim 9 wherein said lower support means is vacuum means.

16. The optical system of claim 9 wherein said pickup means is vacuum means.

17. An optical system for visually selecting and precisely isolating microelectronic units, said optical system comprising a base housing, an upper housing, a first support constrained for motion in said base housing, a second support constrained for motion in said base housing, first optical means including first imaging means having a first pair of conjugate planes in a first optical path, second optical means including second imaging means having a second pair of conjugate planes in a second optical path, observation means visually communicating with one of said first conjugate planes and one of said second conjugate planes, first illumination means for said first optical path, second illuminating means for said second optical path, projection means for optically projecting a bright image of cross hairs, beam splitting means for superposing said bright image on said one of said first conjugate planes and on said one of said second conjugate planes, an upper face of a particular microelectronic unit at the other of said first pair of conjugate planes, a lower face of the particular microelectronic unit at the other of said second pair of conjugate planes, first control means for precisely adjusting the position of said first support with respect to said bright image, second control means for precisely adjusting the position of said second support with respect to said bright image, and third control means for switching said first illuminating means, said second illumination means, and said projection means, whereby the upper and lower faces of the particular microelectronic unit optically centered initially at the center of said cross hairs may be examined, said first optical means including a microscope objective adjacent to said other of said first conjugate planes and said second optical means including a microscope objective adjacent to said other of said second conjugate plane, said observation means being a binocular pair, said projection means including an opaque mask having a slotted shape thereon, said projection means including third imaging means having a third pair of conjugate planes, one of said third pair of conjugate planes being at said slotted mask and the other of said third pair of conjugate planes being coplanar with said other of said first pair of conjugate planes and said other of said second pair of conjugate planes, said third control means selecting one of said first illumination means and said second illumination means.

* * * * *